United States Patent [19]

Lidel

[11] B 4,072,769
[45] Feb. 7, 1978

[54] TREATING POLYMERIC SURFACES

[75] Inventor: Darrel D. Lidel, Rochester, N.Y.

[73] Assignee: Eastman Kodak Company, Rochester, N.Y.

[21] Appl. No.: 313,029

[22] Filed: Dec. 7, 1972

Related U.S. Application Data

[60] Division of Ser. No. 80,482, Oct. 13, 1970, Pat. No. 3,761,299, and a continuation-in-part of Ser. No. 772,745, Nov. 1, 1968, abandoned, and Ser. No. 452, Jan. 2, 1970, abandoned.

[44] Published under the Trial Voluntary Protest Program on Jan. 28, 1975 as document No. B 313,029.

[51] Int. Cl. ............................................. B 05D/306
[52] U.S. Cl. .................................................... 427/38; 204/165; 204/168; 427/40
[58] Field of Search ................. 117/93.1 R, 34, 47 A, 117/106 R, 164; 96/87 R; 204/159.2, 159.14

[56] References Cited

U.S. PATENT DOCUMENTS

| 2,257,177 | 9/1941 | Luster | 204/159.2 |
|---|---|---|---|
| 2,648,097 | 8/1953 | Kritchever | 204/159.2 |
| 2,845,541 | 7/1958 | Berry et al. | 204/159.2 |
| 2,910,723 | 11/1959 | Travel | 204/159.2 |
| 3,148,020 | 9/1964 | Graham | 117/47 A |
| 3,255,099 | 6/1966 | Wolinski | 117/47 A |
| 3,274,090 | 9/1966 | Amborski | 117/93.1 CD |
| 3,274,091 | 9/1966 | Amborski | 117/93.1 CD |
| 3,275,540 | 9/1966 | McBride | 117/93.1 CD |
| 3,493,416 | 2/1970 | Hansen et al. | 117/61 |
| 3,526,583 | 9/1970 | Hayward | 117/47 A |
| 3,600,122 | 7/1966 | Coleman | 117/93.1 CD |

FOREIGN PATENT DOCUMENTS

| 923,846 | 4/1963 | United Kingdom. |
|---|---|---|
| 1,069,953 | 5/1967 | United Kingdom. |

*Primary Examiner*—William R. Trenor
*Attorney, Agent, or Firm*—T. N. Dahl

[57] ABSTRACT

The surface characteristics of polymeric materials are altered by exposure to a reactive gas which has been activated by radio frequency electromagnetic radiations prior to being directed onto the surface. The reactive gas is selected from either the gases which occur naturally with 3-electron bonds, (e.g., NO, $NO_2$, etc.,) or from other gases capable of decomposition in the presence of an electromagnetic field to form (1) activated species which attack the polymer surface to break carbon-hydrogen bonds, forming free radical sites, and (2) free radicals which react with these sites. The process can also be practiced using separate activator and reactive gases, and when the reactive gas selected comprises organic material, the gas stream used to treat the polymeric surface is supplemented by an activator gas comprising the noble gases and nitrogen. The process can be used to change polymeric surface wettability to water or oil, to render polymer films capable of being coated directly with gelatin-containing photosensitive layers with resultant satisfactory adhesion characteristics, etc.

15 Claims, 2 Drawing Figures

TREATING POLYMERIC SURFACES

This is a division of application Ser. No. 80,482 filed Oct. 13, 1970, now U.S. Pat. No. 3,761,299, issued Sept. 25, 1973. This application also is a continuation-in-part of Ser. No. 772,745 filed Nov. 1, 1968, which has been abandoned and of Ser. No. 452, filed Jan. 2, 1970, which also has been abandoned.

This invention relates to the treatment of polymeric surfaces and, more particularly, to a process for changing the characteristics of a polymeric surface (e.g., wettability, gelatin adhesion) without subjecting the surface to chemical, flame, or electrical oxidation and without depositing films of other materials on the substrate.

There are many known methods for treating polymer surfaces to alter their properties, and those generally involve flaming, corona discharge, chemical oxidation, or electrode discharge processes, or various combinations of these processes. All of these known processes have proven unsatisfactory to some degree, either in the difficulty in maintaining quality control at desirable production speeds, or due to the fact that they have deleterious effects on the polymer substrate. Chemical oxidations, for instance, are generally wet processes and, therefore, are relatively slow and have all the attendant problems connected with coating, cleaning and drying materials so treated. Flame treatments are also slow and often adversely affect the bulk properties of the material being treated, particularly if not very carefully controlled, and of course, they also present a constant fire hazard. Corona discharge treatments involving potential gradients across the material being treated often cause pinholes in the material and induced electrostatic charges which raise many problems for post-treatment handling. Electrode discharge systems are hard to maintain because, in the presence of organic materials, one of the typical effects of such discharges is the formation of polymeric films on the electrodes. Such discharge systems, therefore, require constant cleaning of electrodes to remove the polymeric film which acts as an insulator, thereby slowing the flow of the current.

In another known method, polymeric surfaces are bathed in an atmosphere of nitrous oxide ($N_2O$) at elevated temperatures and in the presence of ultraviolet radiation The result of this process is similar to the flame, chemical and corona discharge processes referred to above, namely, the ultraviolet radiation breaks up other bonds as well as carbon-hydrogen bonds (even carbon-carbon bonds) causing relatively severe degradation of the surface of the polymer.

In addition to the prior art referred to above, a treatment for increasing the hydrophilicity of materials is disclosed by J. S. Hayward in U.S. application Ser. No. 625,828, filed Mar. 24, 1967 now U.S. Pat. No. 3,526,583, issued Sept. 1, 1970, and Belgian Pat. No. 712,679. According to the Hayward process, normally hydrophobic polymer surfaces can be rendered hydrophilic when bathed, in the presence of air, in a stream of an activated species of one of the noble gases, or of hydrogen, nitrogen, or oxygen (the latter gas being by far the least effective). While the Hayward method, with its avoidance of raised temperatures and direct impingement of flames or radiation upon the polymer surface, overcomes many of the difficulties inherent in the other prior art methods referred to above, it is a relatively slow and inefficient method for changing the characteristics of a polymer surface. Nonetheless, the Hayward process indicates that activated gas species will attack polymer surfaces in a relatively gentle manner to cause some changes in the surface molecules, and this fact is further substantiated by another prior art process known as CASING (Crosslinking by Activated Species of Inert Gases) Chem. and Eng. News. Vol. 44, Sept. 26, 1966, pgs. 58 and 59, by Hanson et al. which applies similarly activated gases under slightly different conditions to the surface of polymers to strengthen the bonds of the surface molecules. While the literature relating to CASING indicates that such activated gases do not change the wettability of the polymer surface for water, it seems apparent from both the Hayward process and from CASING that monoatomic gas or nitrogen, when activated by electromagnetic radiation, attacks the surface of a polymer in a relatively gentle manner to form free radical sites, and the invention herein utilizes this phenomenon as part of a novel process for selectively altering the surface characteristics of polymers.

It is an object of this invention to provide a simple and economical method for changing the surface properties of polymeric materials.

It is a further object of this invention to change the surface properties of polymeric materials by a non-oxidative process.

It is another object to change the surface properties of polymeric materials without exposing such surfaces to heat, flame or to potential gradients in connection with corona discharge.

It is still another object of this invention to render the surfaces of normally hydrophobic polymeric films capable of being coated directly with gelatin-containing photosensitive layers so that such layers show satisfactory adhesion characteristics.

It is yet a further object of the invention to provide a rapid, dry, and economical process for increasing adhesion of gelatin-containing layers to hydrophobic polymer surfaces.

Yet another object is to avoid the use of conventional undercoat layers normally required between gelatin-containing photographic emulsions and polymeric support surfaces.

This invention herein is based upon the discovery that when certain gases, namely, the noble gases, and nitrogen (such gases hereinafter being referred to as "activator" gases), are activated as described herein, the activated gases apparently not only produce free radical sites when impinged on polymer surfaces, but also produce free radicals from organic vapors (e.g., mercaptopropionic acid) or inorganic vapors (e.g., water) when introduced into the activator gas stream. When a gas stream combining both the activator gas and a vapor capable of producing free radicals (the latter vapor being hereinafter referred to as a "reactive" gas) is activated by radio frequency electromagnetic radiation and is thereafter discharged on the polymer surface being treated, the monomolecular radicals formed from the vapor or reactive gas, react very rapidly with the isolated free radical sites which are produced on the polymer surface by the activator gas. The selection of the reactive gas determines the free radicals which become grafted to the polymer surface by this process, and these free radicals can be chosen to provide desired new surface characteristics. For instance, if the monomoecular radical contains a hydrophilic functional group, a formerly hydrophobic polymer surface is rendered hydrophilic by virture of the hydrophilic functional groups being grafted periodically on its surface. The term "free radical" as used herein means a molecule or ion that contains one or more unpaired electrons. The term "free radical site" has reference to the particular atom, in the molecule or ion, which as the unpaired electrons.

Further, according to one embodiment of the invention, the process can be satisfactorily carried out without requiring the use of a separate activator gas. Excellent results are obtained by using certain inorganic gases alone, namely, nitrogen trioxide ($N_2O_3$) and the "odd molecules" nitrogen oxide (NO) and nitrogen dioxide ($NO_2$). The theory which is suggested herein as a possible explanation of the resulting change in surface characteristics, indicates similar results should be obtained using a reactive gas comprising any of the other odd molecules (e.g., $ClO_2$, $O_2$, OF, etc.) which exist naturally with 3-electron bonds. In addition, water vapor alone produces satisfactory results. Apparently, in the presence of radio frequency electromagnetic energy, these inorganic gases partially decompose into a fragment which is capable of gently attacking the polymer surface to produce isolated free radical sites in the same manner that the activator gases accomplish this. In addition to these radical site-producing fragments, a stream of such an activated inorganic gas also includes free radicals (e.g., the odd molecules themselves which act as free radicals, or the NO and $NO_2$ free radicals formed by the decomposition of the $N_2O_3$ in the presence of the radio frequency radiation) which become bonded to the surface molecules at the sites made available by the activated fragments.

According to another embodiment of the invention, vapors of organic compounds are used as the reactive gas, i.e., the gas which decomposes in the presence of electromagnetic radiation to form the free radicals which are to be bonded to the polymer surface to change its characteristics. However, when passed through an electromagnetic field such organic gases apparently do not, of themselves, produce activated fragments capable of attacking the polymer surface to produce isolated radical sites. Therefore, when such organic gases are used in the general process disclosed herein, it is necessary to mix one of the activator gases into the gas stream prior to its activation by the electromagnetic field in order to produce radical sites on the polymer surface.

The invention will now be described in detail with reference being made to the accompanying drawings wherein like reference characters designate corresponding parts, and in which.

While the following description concerns the treatment of polymeric materials in web form, it should be appreciated that the general processes described herein would be equally effective to treat the surfaces of polymeric materials formed in non-planar shapes as well.

Figure 1:
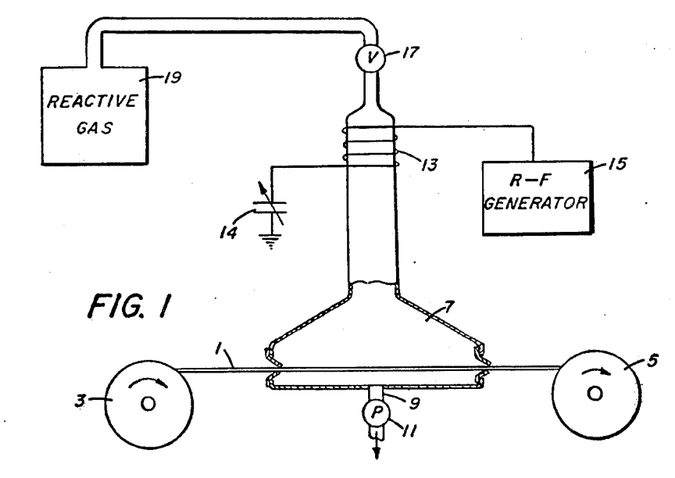
FIG. 1 illustrates, in schematic cross section, simple apparatus which may be used to carry out a preferred form of the invention herein, and FIG. 2 similarly illustrates apparatus for carrying out further embodiments of the invention.

Referring to FIG. 1, a web of polymeric film 1 is delivered from feed spool 3 to take-up spool 5 through reactor chamber 7. At the bottom of the chamber an evacuation pipe 9 is drained by vacuum pump 11. At the top of the chamber, is coil 13 which, in combination with variable capacitor 14, comprises a tunable circuit energized by a radio frequency generator 15. It will be apparent to those skilled in the art that the tuned circuit could just as well comprise the circuit shown in FIG. 2, including a large capacitor 14a, having plates surrounding the top of chamber 7, and a tunable coil 13a. In accordance with this invention, a radio frequency electromagnetic field is generated by coil 13 or capacitor 14a. This field has an internal portion which is defined as that portion of the field contained within the physical volume of the coil or capacitor, i.e., the portion of the field between the capacitor plates or surrounded by the coil 13. This internal portion of the field is removed or remote from the element being treated. Thus, at no time does web 1 pass through the internal position of the field.

Figure 2:
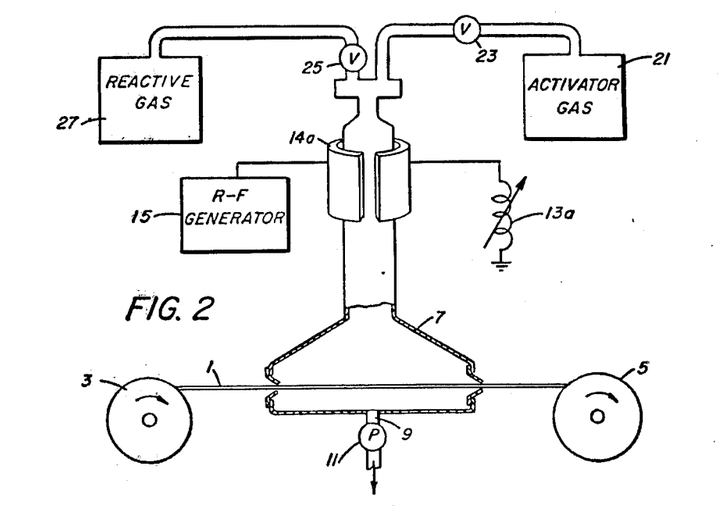

When web 1 is being treated by the method involving exposure to only an activated inorganic reactive gas, supply valve 17 is opened permitting the reactive gas to move from reservoir 19 into reactor chamber 7. On the other hand, if the web is being treated by exposure to a combination of a reactive gas and an activator gas, the apparatus shown in FIG. 2 is used. With the latter apparatus, the activator gas, under pressure in reservoir 21, is delivered through valve 23 to reactor chamber 7, while the reactive gas, in its liquid phase is vaporized through needle valve 25 which controls its flow from reservoir 27. It may be of interest to note that, as an alternative, the activator gas may be bubbled through the reactive material selected in its liquid form and the resulting vapor mixture delivered through an appropriate supply valve to the chamber.

The processes described herein may be operated in the range of total internal pressure of from 0.01 mm to 20 mm of mercury. When an activator gas is used, the pressure of the activator gas may vary over virtually this entire range, with somewhat lower pressure contribution from the reactive gas. When reactive gases alone are used, pressures of from 0.01 mm to 0.8 mm of mercury are preferred. It should be noted in this regard that the process is extremely inefficient if practiced with ambient pressures, because such pressures permit high gas populations which convert most of the radio frequency energy to thermal energy and generate high enough temperatures to affect the bulk properties of the materials being treated. Therefore, the preferred reduced pressures suggested above greatly enhance the effectiveness of the process by permitting lower gas populations which increase efficiency by converting much less of the electromagnetic radiation into thermal energy, thereby utilizing a higher percentage of the r.f. energy for creating activated species, and by lessening the possibilities for deactivating collisions.

The invention herein may be used to treat a wide variety of polymeric surfaces. In fact, most, if not all, polymer surfaces containing interatomic bonds having a dissociation energy of less than about 110 Kcal/mole are operable. In particular, polymeric surfaces having carbon-hydrogen bonds with dissociation energy of less than about 100 Kcal/mole are well suited for treatment by the instant process.

Typical polymeric materials whose surfaces can be altered by the process of this invention include cellulose; cellulose nitrate; cellulose esters such as cellulose diacetate, cellulose triacetate, cellulose propionate, cellulose butyrate, cellulose stearate and the like; polyesters such as poly(ethylene terephthalate) and poly(ethylene terephthalates) modified with additional glycols and/or dicarboxylic acids, poly(1,4-dimethylenecyclohexylene terephthalate) and poly(1,4-dimethylenecyclohexylene terephthalates modified with additional glycols and/or dicarboxylic acids, polyesters derived from dicarboxylic acid and diester and diacid halide derivatives of indan, for example, 1,1,3-trialkyl-5-carboxy-3-(carboxyphenyl)indan, and diols, particularly bisphenols, such as are described in U.S. patent application Ser. No. 813,705, polyesters derived from diol derivatives of indan, for example, 3,3,3',3'-tetramethyl-1,1'-spirobi(indan)-6,6'-diol; polycarbonates, particularly polycarbonates of bisphenols and of substituted bisphenols; polyamides such as 6,6-nylon; polyolefins such as polyethylene, polypropylene, ethylenebutene copolymers and the like; vinyl polymers such as poly(vinyl acetals), e.g., poly(vinyl butyral), polystyrene and copolymers of styrene and other addition polymerizable monomers; addition polymers derived from acrylic acid and methacrylic acid and their esters, and acrylamides and methacrylamides such as copoly(ethyl acrylate-acrylic acid) and polyacrylamide, polytetrafluoroethylene, silicone polymers and the like.

While the exact mechanism of the changes occurring during the subject processing is not known, the following is suggested as a possible theoretical explanation of the observed phenomena:

The radio frequency radiation impinging upon atoms of the activator gas, such as helium, raises some of its electrons to a more highly activated state:

The activated species of the inert gas reacts with two species (in each case producing homolytic cleavage):
a. with the polymer b. with the reactive gas (e.g., mercaptopropionic acid)

$$HSCH_2CH_2COOH \xrightarrow{He^*} \cdot SCH_2CH_2COOH + H$$

Then these react with each other:

Thus, these reactions, which occur predominantly at and on the surface of the polymer, alter the characteristics of the surface by replacing hydrogen, for example, at isolated sites with a substituent containing a functional group selected in accordance with the characteristics desired. Although the mechanism is shown as involving only replacement of a hydrogen atom, a similar mechanism would be involved in the replacement of other moieties such as a halogen atom, a methyl radical, etc, which have appropriate interatomic bond energies with the polymer as described above. Thus, any polymer is useful which has at the surface interatomic bonds which are vulnerable to attack by the activated gas, that is, bonds which undergo homolytic cleavage when subjected to activated gases as described herein.

It will be appreciated that the selection of the reactive gas is determined by the use for which the polymer is intended. The purpose of the treatement may be to improve the water wettability of a normally hydrophobic web so that other materials, especially those derived from aqueous or partially-aqueous solution may be applied at higher speeds to spread faster and provide a better bond. Or the treatment can be employed to greatly reduce the tendency of hydrophobic polymer support materials to retain a static charge. Synthetic fibers may be treated for similar reasons, or the purpose of the treatment may be to alter the characteristics of synthetic fibers and fabrics in order to decrease the contact angle of such treated materials with water and to increase it with oils, and in this manner, the penetration of soil-carrying oils into the synthetic fibers will be inhibited and oils will be more readily removed on washing. On the other hand, by selecting a reactive vapor from among appropriately hydrophobic substances, the water resistance of the polymeric surface may be increased.

An important feature of the subject invention is that it causes a permanent change in the polymeric surface without adding a layer of additional material. As different from most of the prior art processes referred to above which either provide a new coating from the surface or merely cause a temporary oxidative degradation of the surface, the changes wrought by the invention herein appear to be of relatively permanent nature, a feature of great commercial and scientific value.

As reactive gases, vapors of many organic compounds are useful (such as acids, alcohols, esters, amines, nitriles, and vinyl compounds having a vinyl moiety activated by an adjacent electronegative group) as well as water vapor and vapors of other inorganic compounds which are capable of decomposition in the presence of radio frequency radiation to form free radicals. However, as noted above, when organic compounds are used to form the reactive gas, it is usually essential to use an activator gas in conjunction therewith. Therefore, in the selection of organic materials for the reactive gas, the compound should be volatile enough to exhibit a measurable vapor pressure at temperatures ranging from a few degress above absolute zero to several hundred degress Centigrade, the upper limit being imposed only by the thermal characterisitics of the liquid and vapor phases of the reactive gas and of the polymer being treated. Typical materials of this type have a pressure of at least 0.001 mm of mercury at the vaporization temperature employed for introduction of the vapor into the reaction chamber. In general, this temperature can range from about 10° to about 150°C, preferably from about 20° to about 100°C.

The preferred acids useful in this invention are the aliphatic and aromatic mono- and dicarboxylic acids having up to about 10 carbon atoms. The preferred alcohols useful in this invention are aliphatic mono- or polyols, which can have aromatic substituents as well, and phenols having up to about 10 carbon atoms. When the alcohol or phenol is a polyol, it preferably has less than 4 hydroxy groups. The preferred esters of this invention are those derived from the above-mentioned preferred acids and preferred monohydroxy compounds; however, the most useful esters are those derived from the abovementioned preferred acids and an aliphatic, monohydroxy alcohol having less than 6 carbon atoms. The preferred amines useful in this invention are those primary aliphatic and aromatic amines having up to 20 carbon atoms, secondary amines having up to 20 carbon atoms, wherein one of the organic substituents on the nitrogen atom can have up to 18 carbon atoms, and tertiary amines having up to about 20 carbon atoms wherein each of the organic substituents on the nitrogen atom can have up to about 10 carbon atoms. The preferred nitriles, i.e., cyano-substituted compounds, useful in this invention are aromatic and aliphatic cyano-substituted compounds having up to about 10 carbon atoms. The preferred vinyl compounds useful in this invention are those compounds having a vinyl, vinylene or vinylidene group attached to an electronegative, i.e., electron withdrawing, group. Typical known electronegative groups are carbonyl, sulfonyl, cyano, formyl, carboxy, halogen, and nitro groups. Vinyl compounds of this type are also referred to as activated vinyl compounds in that the adjacent electronegative group activates the vinyl moiety. Especially preferred vinyl compounds are those having a vinyl, vinylene or vinylidene group attached to a sulfonyl, carbonyl, or halogen group, i.e., a group wherein Z is an organic sulfonyl group, an organic carbonyl group, or a halogen atom, and in particular, divinylsulfone, and bis(vinylsulfonyl) compounds known in the photographic art to be gelatin hardeners. Another important class of activated vinyl compounds comprises the ester, amide anhydride, and chloride derivatives of acrylic and methacrylic acids, as well as the free acids.

It is essential, of course, that all of said acids, alcohols, esters, amines, nitriles, and vinyl compounds be capable of being vaporized at temperatures up to about 150° C at pressures above 0.001 mm of mercury in order to be operable in the process of this invention.

The application of the invention herein to the treatment of polymeric film supports clearly illustrates the utility of the invention herein. In the photographic film-making art, it is common practice to extrude film support material, such as poly(ethylene terephthalate) and, prior to its biaxial orientation, to apply a polymer latex coating thereto. Also, subsequent to such coating, it is common practice to apply a thin layer of gelatin, after biaxial orientation, to aid in obtaining satisfactory bonding of the photographic emulsion to be applied later. It can be appreciated that the application of two aqueous solutions to the film while it is being fabricated, and the necessity of drying these coatings, limits machine speed and adds considerably to the expense of preparing the film base. There are other methods for preparing such polymer film bases including application of layers from organic solvents, but such methods are also quite expensive and impose other problems such as solvent retention by the support and by the layer subsequently thereto. Also, such methods require expensive solvent recovery systems to avoid fire hazards and solvent toxicity.

The invention herein greatly simplifies the preparation of polymeric film base to render it capable of being directly coated with gelatin-containing photographic emulsion layers. This novel process is not only less expensive, but it is an extremely rapid, homogeneous and dry treatment. According to one embodiment of the invention herein, the film support may be treated with a reactive gas comprising, for example, vapors of an activated vinyl compound as referred to above. Referring once again to FIG. 2, the reactive component in reservoir 37 is delivered through supply valve 25 and an activator gas is delivered through valve 23. The mixture of gases then enters the reactor chamber 7 which is being evacuated by vacuum pump 11. As the mixture enters the chamber, it passes through the electromagnetic field set up by condenser 14a in response to its energization by radio frequency generator 15. While the energy in this electromagnetic field may range widely within the radio frequency spectrum (which as used herein includes from about ½ to about 30,000 megahertz), in a preferred embodiment of the method described herein, radio frequency radiations of about 3 to 150 megahertz are recommended. In selecting a particular activated vinyl compound which will be useful herein, it is sometimes desirable to use typical gelatin hardening compounds to achieve the desired adhesion of the gelatin to normally hydrophobic film base. Preferably activated vinyl gelatin hardening compounds, including such vinylsulfyl-containing gelatin hardeners as divinyl sulfone, bis(vinylsulfonylmethyl) ether, bis(vinylsulfonylethyl) ether, and, in general, bis(vinylsulfonyl) gelatin hardeners of the type described in French Pat. Nos. 1,599,038 and 1,491,807, and U.S. Pat. No. 3,490,911 are employed in practice of the present invention to improve adhesion of gelatin to film base. Although most of the bis(vinylsulfonyl) hardeners are solids, they can be used in the process of this invention by melting or subliming the solids at elevated temperatures prior to introduction, as vapor, into the evacuated reaction chamber.

When only a reactive gas is used, as it passes through the electromagnetic field several things can, and probably do, happen. Again the following is merely theory suggested to cover observed phenomena, and there is no intention to be bound by this theory:

a. Some of the gas may be decomposed:

and/or b. Some of the original gas or fragments thereof may be activated to an excited state:

c. Some of the gas remains unchanged.

When these molecular fragments reach the polymer surface, some of them cause homolytic cleavage of, for example, carbon-hydrogen bonds at isolated sites on the surface:

And these sites quickly react with the free radicals present in the gas stream, e.g.,:

At least one of the radical species (NO$_2$) is quite polar, and its substitution in the bonds at the surface of the polymer renders the surface quite hydrophilic and also capable of adhering to gelatin-containing photographic emulsions without necessitating the use of any subbing layers or solvents as described above. In general, the use of a reactive gas having polar functional groups renders a polymeric surface hydrophilic; whereas, a nonpolar gas typically renders the polymer hydrophobic. As used herein, polar functional group refers to that portion of the molecule which confers a dipole moment on the compound. Exemplary polar functional groups include the following:

Specific examples of the treatment of such film supports are given below, in addition to the descriptions of tests used to determine the adhesion of subsequently coated emulsion layers under both wet and dry conditions. It should be noted that since good hydrophilicity does not necessarily assure a good gelatin bond, the tests of adhesion just referred to above were carried out in each example below relating to the preparation of film support materials.

While only helium and argon are used for activator gases in the examples, below, it is expected that any or all of the inert gases such as neon, krypton, xenon and randon are also operable as well as nitrogen, all of which have been shown in the prior art to cause the desired homolytic cleavage of carbon-hydrogen bonds when activated by electromagnetic radiation. Also, examples 12 through 39 have been set out in chart form to facillitate easy comparisons.

The following examples illustrate with particularity the invention described generally above. The apparatus used to prepare the examples listed below is essentially as shown in the accompanying drawings, except that the polymer being treated are exposed in the reactor chamber as separate samples rather than in the form of continuously moving webs. The radio frequency generator is adjusted to provide 13.56 megahertz at 300 watts for approximately 1 second for each sample. It should be noted that this process is not frequency dependent and that 13.56 megahertz is used simply because it is one of the most convenient of the frequencies designated by the Federal Communications Commission for experimental use. The chamber is evaucated and the gases are introduced with internal pressure as indicated. The film support materials are first treated in the manner just described, coated with gelatin emulsion containing silver halide, and then dried with warm air (approximately 63°C).

I. Treating photographic support materials with reactive gas only to increase emulsion adhesion:
   A. Using nitrogen dioxide as reactive gas:

Example 1

A piece of biaxially oriented poly(ethylene terephthalate) film support 2 inches × 8 inches × 0.004 inch is treated as described above for 1 second with an internal nitrogen dioxide pressure of 0.24 mm Hg. The film is coated with a photographic gelatincontaining emulsion. When the emulsion layer is dry, the film is placed in developer solution for 1 minute, then in a hardening fix for 1 minute, and finally washed in running tap water at 48°C. After washing for 1 hour, an attempt is made to remove the emulsion layer by vigorously rubbing the film between the thumb and first finger ("Wet Rub Test"). The emulsion is not removed by this test, so an attempt is made to remove the emulsion by scratching it with a fingernail, but the emulsion remains intact. Having passed the wet adhesion tests, the film is dried in warm air and then subjected to the "Cellophane Tape Test". The dry emulsion layer is scored in a cross-hatch pattern, and a piece of cellophane tape is pressed firmly over the cross-hatched area. The tape is then stripped quickly from the film. If the gelatin-support bond is strong, the emulsion layer will not be removed by the tape. The emulsion is not removed by this test either.

Example 2

Polycarbonate film support is treated in the apparatus described above for 1 second at a nitrogen dioxide pressure of 0.30 mm Hg. The film is then coated with a photographic emulsion and dried in warm air. The dried film is then wound around a mandrel heated to 235°C for 2 seconds (emulsion toward the mandrel). The appearance of the film is not changed by the hot mandrel test, i.e., no bubbles are formed between emulsion and support, and the emulsion does not peel off of the support. Following the hot mandrel test, the film is subjected to the Cellophane Tape Test, and the emulsion is not removed by the tape.

Example 3

Polyethylene-coated photographic paper is subjected to the same treatment and testing procedure as described in Example 1. The wet emulsion can be scratched with a fingernail; however, it passes the Wet Rub Test. The dried emulsion passes the Cellophane Tape Test.

Example 4

A sample of biaxially oriented poly(cyclohexane-1,4-dimethanol terephthalate) film support is treated and tested as in Example 1 with the same results.

B. Using nitrogen trioxide as reactive gas:

Example 5

A piece of biaxially oriented poly(ethylene terephthalate) film support 5 inches × 7½inches × 0.004 inch is treated as described above for 1 second with an internal N$_2$O$_3$ pressure of 0.18 mm Hg. The treated sample is coated with a standard silver halide-containing gelatin emulsion, chill-set, and air dried at a temperature of 16°–18°C. The dried emulsion layer is then promptly subjected to the Cellophane Tape Test (described in Example 1). None of the emulsion is removed after several repetitions of this test. The sample is allowed to age overnight, and is then developed for 3 minutes, fixed for 5 minutes, washed in running water at 20°–25°C for 15 minutes, and finally dried in air at room temperature. The sample is subjected to the Wet Rub Test (described in Example 1) after developing, and again after fixing. The emulsion is not removed by this test in either case. After the emulsion is dried, it is again subjected to the Cellophane Tape Test, and again the emulsion is not removed by several repetitions of this test.

Example 6

Polycarbonate film support is treated and tested as described in Example 5 above with the following exceptions:
1. An internal $N_2O_3$ pressure of 0.33 mm Hg is used.
2. The emulsion is allowed to age for 8 days prior to processing.

Results of the Cellophane Tape Test before and after processing are the same as described in Example 5. However, the emulsion is removed by the Wet Rub Test.

Example 7

Polyethylene-coated photographic paper is treated and tested as described in Example 6 above, except that an internal $N_2O_3$ pressure of 0.58 mm Hg is used. Test results are the same as those described in Example 5 above.

Example 8

A film of biaxially oriented poly(ethylene terephthalate) is treated in the apparatus indicated above for 1 second with 0.65 mm Hg and 0.1 mm Hg partial pressures of helium and mercaptopropionic acid, respectively. The treated film is coated with a photographic emulsion, dried in warm air, and tested as in Example 1. The processed film passes the Wet Rub Test after the fix, and the dried emulsion passes the Cellophane Tape Test.

Example 9

Biaxially oriented poly(ethylene terephthalate) is treated and tested as indicated in Example 8, except that the gas mixture employed is composed of 0.4 mm Hg and 0.1 mm Hg partial pressures of helium and nitrosyl chloride, respectively. The wet fixed emulsion passes the Wet Rub Test, and the dried emulsion is satisfactory in the Cellophane Tape Test.

Example 10

A sample of polycarbonate film support is treated and tested as described in Example 8. The wet fixed emulsion passes the Wet Rub Test. The dried emulsion is satisfactory in the Cellophane Tape Test.

Example 11

A continuously moving web of biaxially oriented poly(ethylene terephthalate) film is treated and tested as described in Example 1 with the following difference. The film was exposed for 0.7 second to nitrogen gas and 2-acetoacetoxyethyl methacrylate at partial pressures of 0.19 mm Hg and 0.03 mm Hg, respectively. The vehicle for the photosensitive layer consisted of 50 weight percent gelatin and 50 weight percent of a copolymer containing 71.7 weight percent ethylacrylate, 23.9 weight percent acrylic acid and 4.4 weight percent of 2-acetoacetoxyethyl methacrylate. This layer was prepared as described in U.S. Pat. No. 3,459,790, Example 11. The emulsion after treatment was not removed by the Wet Rub Test in either developer or fixer, or by the Cellophane Tape Test on the dried processed film. Another experiment performed exactly as above except that copoly(methyl acrylate---3-acryloyloxypropane-1-sulfonic acid, sodium salt---2-acetoacetoxyethyl methacrylate) (wt. ratio 88.8:4.7:6.5) was used in place of the copoly(ethyl acrylate--acrylic acid--2-acetoxyethyl methacrylate) (wt. ratio 71.7:23.9:4.4) gave the same results.

II — Treating Surfaces to Alter Water Wettability

In the following examples, which are set forth in tabular form, surface water-wettability is altered by treatment with (1) an inorganic reactive gas only, (2) an inorganic reactive gas supplemented by an inert activator gas, (3) an organic reactive gas supplemented by an inert activator gas and (4) control examples using an inert activator gas only. The control examples have been included to illustrate the significant increase in results achieved by the presence of free radicals during exposure of the polymer surface to an activated gas species as disclosed herein. Results are indicated by the well-known "contact angle" tests in which the receptiveness of a surface for a particular liquid is determined by measuring the angle between the surface and the liquid as a drop of the liquid is being moved onto the surface ("advancing") and again as a drop, already adhering to the surface, is being removed ("receding"). In all of those examples, the radio frequency radiation is 13.56 megahertz at 300 watts, and the various blanks are exposed for the times indicated. To facilitate comparisons, the "untreated" wettability of the various materials is as follows:

| Material | Code Designation | Untreated Water Contact Angle Advancing | Receding |
|---|---|---|---|
| Biaxially oriented poly(ethylene terephthalate) | A | 71° 41' | 59° 2' |
| Polyethylene (Marlex 5003) | B | 100° 20' | 79° 50' |
| Polyethylene (coated paper) | C | 95° | 74° |
| Polyurethane (DuPont 85D) | D | 93° 6' | 250° 30' |
| Poly(vinyl chloride) (Koroseal) | E | 50° 24' | 13° 6' |
| Acrylonitrile-butadiene-styrene-copolymer (Royalite) | F | 77° 42' | 30° 30' |

| Example | Material | Exposure Time (Seconds) | Reactive Gas Pressure mm. Hg. | Activator Gas Pressure mm. Hg. | Water Contact Angle Adv. | Recdg. |
|---|---|---|---|---|---|---|
| 12 | A | 1 | ($NO_2$/0.25) | None | 36°01' | 3° 51' |
| 13 | A | 1 | ($NO_2$/0.08) | (He/0.40) | 38°58' | 0° 43' |
| 14 | A | 1 | $H_2O$ | (He/0.65) | 49°46' | 0° |
| 15 | A | 1 | None | (He/0.62) | 54°42' | 9° 30' |
| 16 | A | 1 | ($CH_2$=CHCOOH | (He/0.68) | 41°21' | 0° 47' |
| 17 | A | 2 | ($H_2NCH_2CH_2CH_2OH$/0.10) | (He/0.65) | 45°21' | 8° 15' |
| 18 | A | 3 | ($HSCH_2CH_2COOH$/0.05) | (Ar/0.51) | 46°54' | 2° 03' |
| 19 | A | 2 | ($CH_2$=CHCN/0.21) | (He/0.55) | 44°15' | 0° 30' |
| 20 | A | 1 | ($CH_3OH$/0.15) | (He/0.65) | 48°21' | 1° 0' |
| 21 | B | 1 | ($NO_2$/0.19) | None | 43°25' | 2° 50' |

-continued

| Example | Material | Exposure Time (Seconds) | Reactive Gas Pressure mm. Hg. | Activator Gas Pressure mm. Hg. | Water Contact Angle Adv. | Water Contact Angle Recdg. |
| --- | --- | --- | --- | --- | --- | --- |
| 22 | B | 1 | ($NO_2$/0.07) | (He/0.41) | 51°57' | 5° 22' |
| 23 | B | 1 | $H_2O$ | (He/0.60) | 54°12' | 2° |
| 24 | B | 1 | None | (He/0.63) | 73°22' | 54°52' |
| 25 | B | 1 | ($CH_2$=CHCN/0.27) | (He/0.55) | 59°06' | 1° 30' |
| 26 | B | 2 | ($HSCH_2CH_2COOH$/0.20) | (He/0.70) | 54° 0' | 5° 21' |
| 27 | B | 2 | $CH_2$=CHCOOH | (He/0.65) | 65°39' | 6° 9' |
| 28 | C | 1 | ($NO_2$/0.18) | None | 59°34' | 4° 34' |
| 29 | C | 1 | ($NO_2$/0.07) | (He/0.41) | 63°15' | 8° 16' |
| 30 | D | 15 | $CH_2$=CHCOOH | (He/0.70) | 56°45' | 1°18' |
| 31 | D | 15 | ($HSCH_2CH_2COOH$/0.20) | (He/0.50) | 63°36' | 1° 15' |
| 32 | E | 15 | ($CH_2$=CHCOOH) | (He/0.75) | 65°30' | 1° 27' |
| 33 | F | 2 | $HSCH_2CH_2COOH$ | (He/0.50) | 48°27' | 0° 31' |

III — Treating Surfaces to Alter Oil Wettability

In the following tabular-form examples, polyester fabrics Kodel II (a copolymer of cyclohexanedimethanol and terephthalic acid), designated below as G, and Kodel IV (polyethylene terephalate), designated H below, are treated by the process disclosed herein to become very highly resistant to oils. The test used to show such change in the surface characteristics of the polyester fabrics is as follows: a small piece of the fabric being tested is tautly stretched over the mouth of a test tube and placed in a beaker of water so that the fabric parallels the bottom of the beaker. A curved dropper is then used to release a drop of oleic acid beneath the fabric. The water in the beaker is saturated with oleic acid prior to the test, and so a droplet of the acid would normally rise to the surface. Since the fabric is positioned between the mouth of the dropper and the water surface, a droplet being released from the dropper can be released against the surface of the fabric and its "advancing contact angle" can be measured in the same manner as discussed above in relation to Examples 12–33. In order that the remarkable results achieved by the process herein may be more fully appreciated, it should be noted that when the just-described test is carried out with untreated samples of the polyester fabrics treated in Examples 34–39, the fabrics normally wet completely with the oleic acid, i.e., the normal contact angle for oleic acid on these polyester fabrics is 0°0' advancing.

| Example | Materials | Exposure Time (Seconds) | Reactive Gas Pressure mm Hg | Activator Gas Pressure mm Hg | Oil Contact Angle Advancing |
| --- | --- | --- | --- | --- | --- |
| 34 | G | 15 | $CH_3CH(CH_3)OH$ 0.12 | He 0.73 | 143° |
| 35 | H | 5 | $CH_3OH$ 0.15 | He 0.65 | 126°6' |
| 36 | H | 5 | $CH_3OH(CH_3)OH$ 0.1 | He 0.70 | 154°45' |
| 37 | H | 2 | $CH_2$=CHCOOH 0.68 | He | 77° |
| 38 | H | 5 | $HSCH_2CH_2COOH$ 0.05 | Ar 0.53 | 151°30' |
| 39 | H | 5 | $HSCH_2CH_2COOH$ 0.05 | He 0.58 | 154° |

Example 40

A piece of 100 percent cotton fabric was placed in the activator cell and the cell was evacuated. Methylene chloride vapor was then admitted to the cell at a rate such that the internal pressure was maintained at 0.12 mm Hg. Then helium was admitted at a rate which yielded an increase in internal pressure of 0.33 mm Hg. (Total pressure 0.45 mm Hg.) The radio frequency source was then turned on for 15 seconds. The sample was then removed, turned over, and the above procedure was repeated.

A drop of water was then placed on the treated sample and another drop of water was placed on an untreated control sample. The drop placed on the control sample was immediately absorbed into the fabric. The drop placed on the treated sample stood up on the surface of the fabric with a contact angle which appeared to be greater than 90°. No absorption into the cotton fabric was observed. The drop was left on the fabric sample until it evaporated with no observable change in contact angle.

Example 41

A continuously moving web was treated as described in Example 11 except that the reactive gas used was divinyl sulfone, and the activator gas was He. The reaction chamber was again evacuated to 0.03 mm Hg. This pressure includes the partial pressure of divinyl sulfone. Helium was admitted at a rate such that a pressure of 0.12–0.25 mm Hg was maintained. Web speed and consequent exposure time was the same as in Example 11. The thus treated biaxially oriented polyethylene terephthalate film base was coated with a photographic silver halide emulsion as described in Example 1. The dried emulsion survived the Cellophane Tape Test.

Example 42

A film of biaxially oriented poly(ethylene terephthalate) film is treated, coated, and tested as described in Example 8 except that the gas mixture employed in this example is composed of helium (partial pressure 0.5 mm Hg) and 2-hydroxyethyl methacrylate (partial pressure about 0.04 mm Hg). Test results are similar to those obtained in Example 8.

Example 43

The procedure of Example 42 is repeated using as the gas mixture helium (partial pressure 0.3 mm Hg) and n-3-oxobutyl acrylate (partial pressure about 0.02 mm Hg). Results similar to those of Example 42 are obtained.

Example 44

The procedure of Example 42 is again repeated using a mixture of helium (partial pressure 0.28 mm Hg) and 1-acryloyl-1-acetylacetone (partial pressure about 0.04 mm Hg); similar results are obtained.

Example 45

The procedure of Example 14 is repeated twice. The first time, the system is tuned such that the glow of the gases extends from capacitor generating the field to the poly(ethylene terephthalate) being treated (the activated gases, of course, do impinge on the surface being treated). Upon testing the resultant surfaces as before, no substantial difference is observed in the results obtained.

Example 46

A film of biaxially oriented poly(ethylene terephthalate) is treated, coated, and tested as described in Example 8 except that the gas mixture employed is composed of helium (partial pressure 0.3 mm Hg) and bis(vinylsulfonylmethyl) ether (partial pressure 0.03 mm Hg). The reactive ether gas is obtained from solid bis(vinylsulfonylmethyl) ether by heating to approximately 80°C in the system vacuum in order to vaporize it. Test results are similar to those obtained in Example 8.

It should be noted that in several of the above examples, no partial pressure is shown for the reactive gas used therein, because the method followed in these examples is that referred to above wherein the activator gas is bubbled through the liquid phase of the reactive gas, the resulting combined vapor being delivered to the reactor chamber. With such procedure, the partial pressure of the reactive gas is not known, and the pressure indicated beneath the activator gas is, in fact, the total pressure for both gases as they enter the reactor chamber.

Because of the reduced pressure under which the process of this invention is run, the gases passing through the electromagnetic field often glow even a considerable distance from the coil 13 or condenser 14a. The glowing often extends to and beyond the article being treated. Unless the article being treated is light sensitive, the process is operable whether the article is in or out of these glowing gases.

As noted previously, this process may be conducted using a frequency of from ½ to 30,000 megahertz. However, the most practical frequency of use is in the range of about 3 to about 150 megahertz. The use of lower frequencies allows for easy treatment of larger materials such as webs several feet in width; whereas, the higher frequencies (e.g., microwave) generally require a smaller sized cavity or reaction chamber. This smaller chamber limits the size of the article which can be treated.

Additionally, the temperature at which the cell or reaction chamber is kept is not critical, provided that it does not get so hot as to degrade the article being treated. In general, the reaction is conducted at about room temperature (about 20°C) but when higher pressures are used, the temperature may go as high as about 100°C. Preferably, the temperature is below about 75°C.

The invention has been described in detail with particular reference to certain preferred embodiments thereof, but it will be understood that variations and modifications can be effected within the spirit and scope of the invention.

I claim:

1. A process for changing the properties of a surface of a shaped organic polymeric material, said surface containing carbon to hydrogen bonds having a dissociation energy of less than about 100 K cal./mol, said process comprising exposing said surface to a stream of a mixture of (1) a reactive gas selected from the group consisting of (a) $N_2O_3$, (b) water vapor and (c) a vapor of an organic compound which is an acid, an alcohol, an ester, an amine, a nitrile or a vinyl compound having a vinyl moiety activated by an adjacent electronegative group, said gas having a partial pressure of at least 0.001 mm. Hg. at a temperature in the range of about 10 to about 150°C., with (2) an activator gas selected from the group consisting of argon, helium, krypton, neon, nitrogen, radon, xenon and mixtures thereof, said stream of gases having been activated by treating with a radio frequency electromagnetic field ranging from about ½ to about 30,000 megahertz and said field being remote from said support, said process being conducted at a pressure of about 0.01 to about 20 mm Hg., said acid being an aliphatic or aromatic mono- or dicarboxylic acid having up to about 10 carbon atoms, said alcohol being aliphatic mono- or polyol or a phenol having up to about 10 carbon atoms, said ester being an ester being derived from said acid and an aliphatic monohydroxy alcohol having less than 6 carbon atoms, said amine being primary, secondary or tertiary aliphatic or aromatic amine having up to 20 carbon atoms, said nitrile being an aromatic or aliphatic cyano-substituted compound having up to about 10 carbon atoms, and said vinyl compound being a compound having a vinyl, vinylene or vinylidene group attached to a carbonyl, sulfonyl, cyano, formyl, carboxy, halogen or nitro group.

2. The process of claim 1 wherein the activator gas is helium.

3. The process of claim 1 wherein said reactive gas is $N_2O_3$.

4. The process of claim 1 wherein said reactive gas is water vapor.

5. The process of claim 1 wherein said reactive gas is a vapor of an organic compound which is an acid, an alcohol, an ester, an amine, a nitrile or a vinyl compound having a vinyl moiety activated by an adjacent electronegative group.

6. The process of claim 5 wherein said activator gas is helium or argon.

7. The process of claim 6 wherein the reactive gas is mercaptopropionic acid, nitrosyl chloride, 2- acetoacetoxyethyl methacrylate, acrylic acid, 3-hydroxypropylamine, acrylonitrile, methanol, isopropyl alcohol, divinyl sulfone, methylene chloride, n-3-oxybutyl acrylate, 2-hydroxyethyl methacrylate, 1-acryloyl-1-acetylacetone, or bis(vinylsulfonylmethyl)ether.

8. The process of claim 1 wherein said polymeric material is a polyester, polyolefin, polycarbonate, polyvinyl chloride, acrylonitrile-butadiene-styrene copolymer, or polyurethane.

9. The process of claim 8 wherein said polymeric material is biaxially-oriented poly(ethylene terephthalate) film.

10. The process of claim 8 wherein said polymeric material is polyethylene.

11. A polymeric article treated by the process of claim 1.

12. A polymeric article treated by the process of claim 7.

13. A polymeric article treated by the process of claim 8.

14. A polymeric article treated by the process of claim 9.

15. A polymeric article treated by the process of claim 10.

* * * * *

UNITED STATES PATENT AND TRADEMARK OFFICE
CERTIFICATE OF CORRECTION

PATENT NO. : 4,072,769
DATED : February 7, 1978
INVENTOR(S) : Darrel D. Lidel

It is certified that error appears in the above-identified patent and that said Letters Patent are hereby corrected as shown below:

Column 16, line 38 change "support" to -- surface --.

Signed and Sealed this

Twentieth Day of March 1979

[SEAL]

Attest:

RUTH C. MASON
Attesting Officer

DONALD W. BANNER
Commissioner of Patents and Trademarks